United States Patent
Pop et al.

(10) Patent No.: US 9,274,248 B2
(45) Date of Patent: Mar. 1, 2016

(54) DOWNHOLE MASS SPECTROMETRY

(75) Inventors: Julian J. Pop, Houston, TX (US); Reza Taherian, Sugar Land, TX (US); Pierre J. Daniel, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1286 days.

(21) Appl. No.: 12/690,168

(22) Filed: Jan. 20, 2010

(65) Prior Publication Data

US 2010/0181471 A1 Jul. 22, 2010

Related U.S. Application Data

(60) Provisional application No. 61/146,243, filed on Jan. 21, 2009.

(51) Int. Cl.
  *G01V 5/00* (2006.01)
  *G01V 9/00* (2006.01)
  *H01J 49/00* (2006.01)

(52) U.S. Cl.
  CPC .. *G01V 9/00* (2013.01); *H01J 49/00* (2013.01)

(58) Field of Classification Search
  USPC ........................................ 250/253, 255, 281
  See application file for complete search history.

(56) References Cited

U.S. PATENT DOCUMENTS

| | | | |
|---|---|---|---|
| 4,547,691 A | 10/1985 | Valdois et al. | |
| 5,394,345 A | 2/1995 | Berard et al. | |
| 5,521,382 A | 5/1996 | Tanaka | |
| 6,093,929 A | 7/2000 | Javahery | |
| 6,670,605 B1 * | 12/2003 | Storm et al. | 250/255 |
| 7,002,142 B2 | 2/2006 | Mullins et al. | |
| 7,075,063 B2 | 7/2006 | Dong et al. | |
| 7,114,562 B2 | 10/2006 | Fisseler et al. | |
| 7,170,051 B2 | 1/2007 | Berkout et al. | |
| 7,180,056 B2 | 2/2007 | Ohtake et al. | |
| 7,196,323 B2 * | 3/2007 | Walk et al. | 250/282 |
| 7,210,342 B1 | 5/2007 | Sterner et | |
| 7,301,145 B2 | 11/2007 | Holle et al. | |
| 7,379,180 B2 | 5/2008 | Vannuffelen et al. | |
| 2005/0205256 A1 | 9/2005 | DiFoggio | |
| 2008/0257036 A1 | 10/2008 | Chaudoreille et al. | |

FOREIGN PATENT DOCUMENTS

| | | |
|---|---|---|
| GB | 2433273 | 6/2007 |
| WO | 99/35669 | 7/1999 |
| WO | 03/083448 | 10/2003 |
| WO | 03/094197 | 11/2003 |
| WO | 2008069962 | 6/2008 |
| WO | 2010009411 | 1/2010 |

OTHER PUBLICATIONS

Dong, C. et al., New Downhole Fluid Analyzer Tool for Improved Reservoir Characterization, SPE 108566, Aberdeen, Scotland, U.K., Sep. 4-7, 2007.

* cited by examiner

*Primary Examiner* — Rafferty Kelly
(74) *Attorney, Agent, or Firm* — Kenneth L. Kincaid

(57) ABSTRACT

A method comprising using a first mass analyzer of a downhole tool to isolate specific ions within a sample received in the downhole tool, using a second mass analyzer of the downhole tool to stabilize the ions isolated by the first mass analyzer, and using a third mass analyzer of the downhole tool to catalog the stabilized ions.

18 Claims, 10 Drawing Sheets

US 9,274,248 B2

DOWNHOLE MASS SPECTROMETRY

CROSS-REFERENCE TO RELATED APPLICATIONS

This application claims the benefit of U.S. Provisional Application No. 61/146,243, entitled "DOWNHOLE MASS SPECTROMETRY INSTRUMENTATION," filed Jan. 21, 2009, the entire disclosure of which is hereby incorporated herein by reference.

This application is also related to PCT Application PCT/US09/51016, entitled "Hydrocarbon Determination in Presence of Electron and Chemical Ionization," filed Jul. 17, 2009, the entire disclosure of which is hereby incorporated herein by reference. It claims the benefit of U.S. Provisional Application No. 61/081,621, entitled "METHOD FOR DETERMINING HYDROCARBON IN PRESENCE OF ELECTRON AND CHEMICAL IONIZATION," filed Jul. 17, 2008.

BACKGROUND OF THE DISCLOSURE

In a classical quadrupole mass spectrometer, molecules are bombarded by high energy electrons, resulting in the fragmentation of the molecular ions. These fragments are very similar to each other, where respective intensities can help to discriminate the original molecules through the use of a spectrum superposition technique.

In the case of mud gas logging, methane is a major contributor to the mud content. This gas is typically used as a chemical reagent for chemical ionization. At the spectrum level and in the presence of methane, a single peak contribution can come from electron ionization induced ions and chemically generated ions. With a large number of molecules, it can be difficult to reduce the uncertainty of the molecule composition in the original mud sample with the fragments originating from multiple molecules, even from isomers of these molecules.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
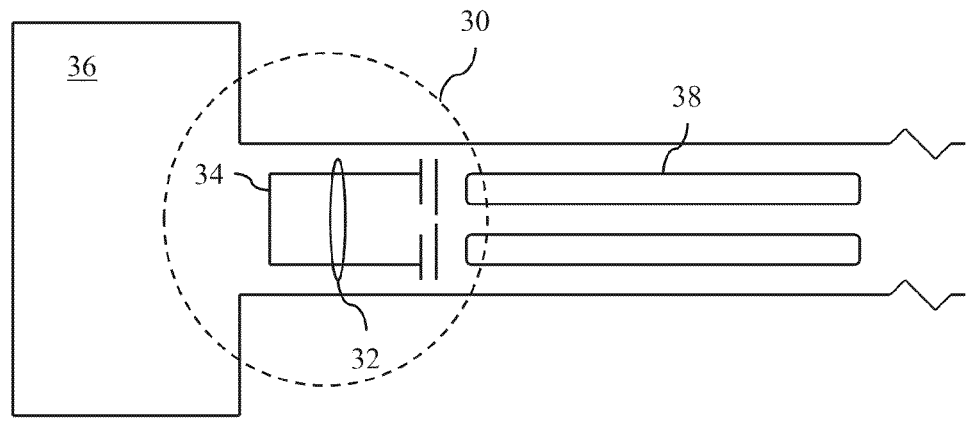
FIG. 1 is a schematic view of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Instead of focusing on methods to analyze electron ionization induced spectrum, one may use the presence of a chemical reagent downhole, such as methane, to optimize the chemical ionization process. This process allows more stable ions, thus generating fewer fragmentation ions. The molecular ion peak in the spectrum is so strong that the discrimination between different molecules of different masses is simple, even for molecules of mass as high as 142 (Decane) present in the mud.

Mass spectrometer spectrum provides molecule abundance for a given mass/charge value, not allowing the discrimination between isomers. To solve this difficulty, one may apply tandem mass spectrometry downhole. This technique involves multiple steps of mass selection or analysis, usually separated by some form of fragmentation. There are various methods for fragmenting molecules for tandem MS, including collision-induced dissociation (CID), electron capture dissociation (ECD), electron transfer dissociation (ETD), infrared multi-photon dissociation (IRMPD) and blackbody infrared radiative dissociation (BIRD).

Other aspects related to the present disclosure are provided in U.S. Pat. No. 7,301,145 to Holle, et al., U.S. Pat. No. 7,210,342 to Sterner, et al., U.S. Pat. No. 7,180,056 to Ohtake, et al., and U.S. Pat. No. 7,170,051 to Berkout, et al., each of which are hereby incorporated herein in their entirety.

In an electron ionization source, electrons are produced through thermionic emission by heating a wire filament that has electric current running through it. The electrons are accelerated through the ionization space towards an anode. In the ionization space, they interact with analyte molecules in the gas phase, causing them to ionize to a radical ion, and frequently causing numerous cleavage reactions that give rise to fragment ions, which can convey structural information about the analyte.

The efficiency of ionization and production of fragment ions depends strongly on the chemistry of the analyte and the energy of the electrons. If this analyte is a molecule of methane, ammonia or isobutene, called a reagent gas, chemical ionization will happen at the same time as electron ionization (fragment generation).

FIG. 1 is a schematic view of an open ion source (OIS) 30 in which the filament wire 32 and the anode wire cage (or "grid") 34 are "open" to the surrounding vacuum chamber 36.

All molecules that are moving around in the vacuum chamber 36 can easily move through the OIS 30. The pressure in the ionizer 30 is the same as in the rest of the surrounding vacuum (i.e., of vacuum chamber 36) and also the same as in the quadrupole mass filter/analyzer 38 and ion detector (not shown). The OIS 30 is "open" to all the gaseous molecules in the vacuum chamber 36 and can be used to monitor and detect changing gas levels as long as the overall pressure remains under $10^{-4}$ Torr. Higher pressures result in a decrease in sensitivity due to space charge repulsion between ions when filtered though the quadrupole mass analyzer 38.

Because the OIS 30 is a hot-cathode ion source, the filament wire (i.e., the cathode) 32 must be heated to high temperatures (e.g., >1300° C.) in order to establish an electron emission current. In the high vacuum, most of the energy required to heat the filament 32 is dissipated to the surroundings through radiative processes. As a result, the entire ionizer and the adjacent walls "run hot". The elevated temperatures result in increased outgassing from the OIS 30 itself, and from the adjacent chamber walls. In the most benign cases, outgassing simply modifies the composition of the gas mixture being measured. However, under some circumstances, outgassing can be a serious problem and even ruin experiments and samples. The gases emitted by the outgassing process obscure the minimum detectable partial pressures (MDPP's) of many important gases including: $H_2$, $H_2O$, $N_2$, CO and $CO_2$. Degassing the ionizer can help minimize some of the background signals; however, this is usually only a temporary solution. (During a degas, the ion source is ramped up to a temperature significantly above its normal operating value, and bombarded with high energy electrons, in order to accelerate the outgassing process.)

Measurement uncertainties can come forward from the source chamber, but background interferences can also appear from the quadrupole mass filter assembly. The latter has a large surface area in comparison to the ionizer and, even though it does not get as hot as the ionizer during operation, it still outgasses. The fact that the OIS is exposed to the same vacuum environment as the rest of the sensor makes the ionizer sensitive to the impurities outgassed by the rest of the quadrupole assembly. A serious problem for many residual gas analysis (RGA) users (particularly in the UHV range) is $H_2O$ outgassing from unbaked RGAs. However, other species are also present that can affect the background readings. For example, high Ar backgrounds can be expected if the sensor was recently exposed to large levels of the gas because it tends to get adsorbed on all surfaces and desorbs slowly. The ionizer is also sensitive to impurities generated at the hot filament. Gas molecules can suffer thermal cracking and chemical reactions at the filament surface and the products of the reaction can easily find their way into the ionization region. The impurities generated in this fashion are usually an important source of contamination of the ionizer's surfaces and have a serious effect on the RGAs long term stability. For example, CO and $CO_2$ are emitted by most hot filaments (carbon impurities in the filament wire react with oxygen) and easily find their way into the ionizer and vacuum system.

Along with background uncertainties due to the OIS configuration, the presence of methane in downhole mud will generate chemical ionization of the molecules present.

In theory, the chemical ionization is produced due to a reagent gas R introduced into the ion source at a concentration in large excess (~$10^4$:1) to that of the sample, the agent being ionized by electron bombardment or electric discharge. Electrons entering the source will preferentially ionize the reagent gas. The resultant collisions with other reagent gas molecules will create an ionization plasma. Ions of the analyte are formed by reactions with this plasma.

| Primary Ion Formation (electron ionization): | Secondary Reagent Ions: | Product Ion Formation: |
|---|---|---|
| $R + e^- \rightarrow R^{\cdot+} + 2e^-$ | $R + R^{\cdot+} \rightarrow RH^+ + (R-H)^{\cdot}$ <br> $R + R^{\cdot+} \rightarrow (R-H)^+ + RH^{\cdot}$ | $M + RH^+ \rightarrow R + MH^+$ (protonation) <br> $M + (R-H)^+ \rightarrow (R-2H) + MH^+$ (protonation) <br> $M + (R-H)^+ \rightarrow R + (M-H)^+$ (hybride abstraction) <br> $M + R^{\cdot+} \rightarrow R + M^{\cdot+}$ (charge exchange) |

Among this wide variety of possible ionization reactions, the most common are: protonation, which is favored for sample molecules of proton affinity higher than that of the reagent; hybride abstraction common for lower-proton-affinity molecules such as alkanes; and charge exchange which is favored for reagents of high ionization energy, such as helium. The internal energy of the resulting ionized M species depends on the reagent chosen and the ion source temperature and pressure.

In a mud logging measurement, this chemical ionization process co-exists with electron ionization as a side effect sufficient to corrupt the measurement if not considered in the composition concentration calculation. A new set of equations has to be derived in which electrons and chemically induced ions are superimposing:

$$^y S = \sum_{i=1}^{n} {^y a_i} X_i P + \sum_{j=1}^{n} \sum_{k=1}^{n} [(^y a'_{j,k} X_j X_k + {^y b'_{j,k}}) \cdot P + (^y a''_{j,k} X_j X_k + {^y b''_{j,k}})]$$

with the first term being the electron ionization effect, the second term being the chemical ionization effect (cross-species interaction).

Figure 2:
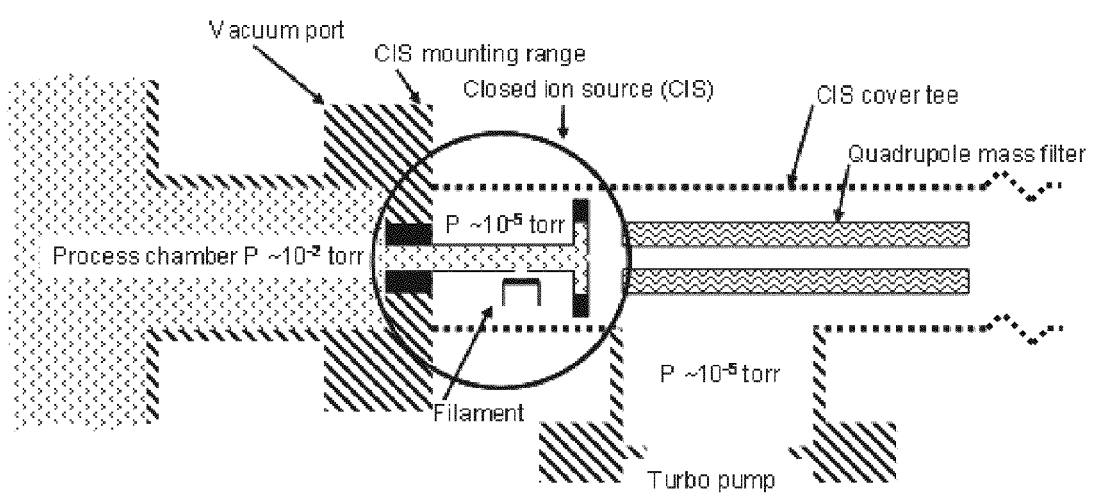
FIG. 2 is a schematic view of apparatus according to one or more aspects of the present disclosure.

To optimize chemically produced ions versus electron ionization-induced fragmentations, a closed ion source (CIS) configuration could be applied. As shown in the example CIS configuration shown in FIG. 2, the CIS ionizer sits on top of the quadrupole mass filter replacing the more traditional CIS used in conventional RGAs. It consists of a short, gas-tight tube with two very small openings for the entrance of electrons and the exit of ions. Electrons enter the ionizing region through an entrance slit of small dimensions. The ions are formed close to, and attracted by, a single extraction plate and exit the ionizer through a circular aperture of small diameter. Alumina rings seal the tube from the rest of the quadrupole mass assembly and provide electrical insulation for the biased electrodes. Ions are produced by electron impact directly at the process pressure. A pumping system keeps the filament and the rest of the quadrupole assembly at pressures below $10^{-5}$ Torr through differential pumping. Other components of the CIS configuration are also identified in FIG. 2.

The primary interest of such a configuration is to increase the chemical ionization process. The higher pressure chamber increases the abundance of methane. The chances of electron ionizing a molecule of methane, which will then chemically ionize molecules in the sample, are strongly improved. Because the chemical ionization process mostly produces molecular ions, this peak will now only depend on the presence of the reagent, the molecule being chemically ionized, and the overall pressure of the sample. In a CIS configuration, the molecular peak could not be used because of its relative weakness; with a CIS configuration, it will be no more a superposition of fragments, reducing the calculation uncertainty.

Another advantage of this configuration is the reduction of signal over noise. Because the sampling pressure in the CIS is typically two decades higher than that of the rest of the sensor's vacuum system, the signal-to-background ratio is significantly increased relative to the OIS systems. This is particularly important when measuring common residual gases, such as water. For other common interferences, such as organic contaminants or reaction byproducts of the filament, the gas tight design of the source reduces the visibility of the ionization region to those gases providing a very clean residual gas spectrum, free of many of the spectral overlaps that are common in OIS setups. Interference from contaminants generated by electron stimulated desorbtion (ESD) is also reduced in the CIS because a much smaller electron beam penetrates the ionizing volume. In addition, the inside walls of most commercially available CIS systems are made out of highly inert materials such as gold, platinum clad, and pure molybdenum, which adsorb less impurities than stainless steel.

Figure 3:
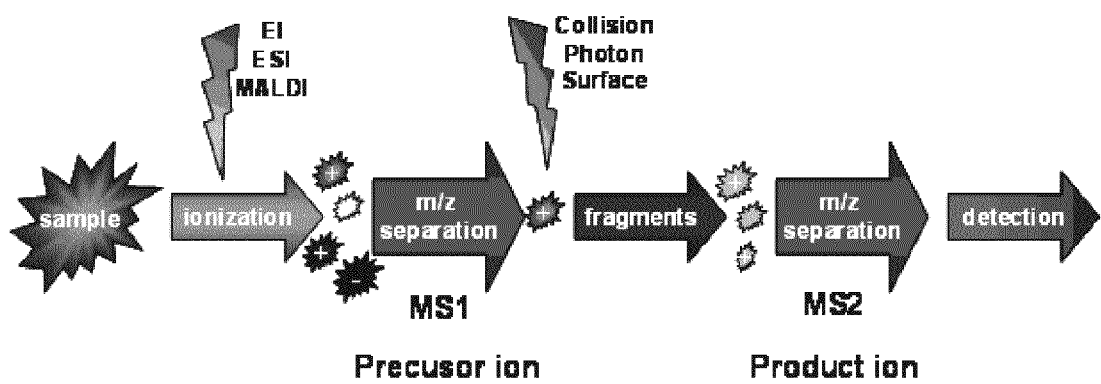
FIG. 3 is a schematic view of a process according to one or more aspects of the present disclosure.

A third configuration may allow a better discrimination between molecules, but may also lack discrimination between molecules of same mass, like isomers. That is, for this particular measurement in a downhole environment, a tandem mass spectrometer could be used downhole with a collision induced dissociation chamber. FIG. 3 is a schematic demonstrating aspects of tandem mass spectrometry. Multiple stages of mass analysis separation can be accomplished with individual mass spectrometer elements separated in space or in a single mass spectrometer with the MS steps separated in time. In tandem mass spectrometry in space, the separation elements are physically separated and distinct, although there is a connection between the elements to maintain high vacuum. These elements can be sectors (electric and magnetic fields), transmission quadrupole, or time-of-flight (time for the ions to reach detectors).

A sector instrument is a general term for a class of mass spectrometer that utilizes a static electric or magnetic sector or some combination of the two (separately in space) as a mass analyzer. A popular combination of these sectors has been the BEB (magnetic-electric-magnetic).

The transmission quadrupole comprises four parallel metal rods. Each opposing rod pair is connected together electrically and a radio frequency (RF) voltage is applied between one pair of rods, and the other. A direct current voltage is then superimposed on the RF voltage. Ions travel down the quadrupole in between the rods. Only ions of a certain m/z will reach the detector for a given ratio of voltages, as other ions have unstable trajectories and will collide with the rods. This allows selection of a particular ion, or scanning by varying the voltages.

Time-of-flight mass spectrometry (TOF-MS) is a method of mass spectrometry in which ions are accelerated by an electric field of known strength. This acceleration results in an ion having the same kinetic energy as any other ion that has the same charge. The velocity of the ion depends on the mass-to-charge ratio. The time that it subsequently takes for the particle to reach a detector at a known distance is measured. This time will depend on the mass-to-charge ratio of the particle (heavier particles reach lower speeds). From this time and the known experimental parameters, one can find the mass-to-charge ratio of the ion.

In a tandem mass spectrometry in time instrument, the separation is accomplished with ions trapped in the same place, with multiple separation steps taking place over time. A quadrupole ion trap or FTMS instrument can be used for such an analysis. Trapping instruments can perform multiple steps of analysis, which is sometimes referred to as MS" (MS to the n). Often the number of steps, n, is not indicated, but occasionally the value is specified. For example, $MS^3$ indicates three stages of separation. There are a number of different tandem MS experiments, which each have their own applications and offer their own information.

There are four main scan experiments possible using MS/MS: Product Ion Scan, Precursor Ion Scan, Neutral Loss Scan, and Selected Reaction Monitoring.

With Product Ion Scan, a precursor ion is selected in the first stage, allowed to fragment, and then all resultant masses are detected in the second mass analyzer. This experiment is commonly performed to identify transitions used for quantification by tandem MS.

With Precursor Ion Scan, the product ion is selected in the second mass analyzer, and the precursor masses are scanned in the first mass analyzer. A precursor ion scan cannot be done with time based MS instruments.

With Neutral Loss Scan, the first mass analyzer scans all the masses. The second mass analyzer also scans, but at a set offset from the first mass analyzer. This offset corresponds to a neutral loss that is commonly observed for the class of compounds. Neutral loss scans also cannot be done with time based MS instruments.

With Selected Reaction Monitoring, both mass analyzers are set to a selected mass. This mode is analogous to selected ion monitoring for MS experiments. It is a very selective analysis mode, which can increase sensitivity.

The fragmentation of gas-phase ions is essential to tandem mass spectrometry and occurs between different stages of mass analysis. There are many methods used to fragment the ions and can result in different types of fragmentation, and thus provide information about the structure and composition of the molecule. Such methods include in-source fragmentation (such as nozzle-skimmer fragmentation, electrospray ionization, and matrix-assisted laser desorption ionization) and post-source fragmentation (such as collision-induced dissociation (CID) and electron capture dissociation (ECD), among others discussed below).

Regarding in-source fragmentation, the ionization process is often sufficiently violent to leave the resulting ions with sufficient internal energy to fragment within the mass spectrometer. If the product ions persist in their non-equilibrium state for a moderate amount of time before auto-dissociation, this process is called metastable fragmentation.

Nozzle-skimmer fragmentation refers to the purposeful induction of in-source fragmentation by increasing the nozzle-skimmer potential on usually electrospray-based instruments. Although in-source fragmentation allows for fragmentation analysis, it is not technically tandem mass spectrometry unless metastable ions are mass analyzed or selected before auto-dissociation and a second stage of analysis is performed on the resulting fragments.

In electrospray ionization, a liquid is pushed through a very small, charged and usually metal, capillary. This liquid contains the analyte (substance to be studied), dissolved in a large amount of solvent, which is usually much more volatile than the analyte. The analyte exists as an ion in solution either in its anion or cation form. Because same charge ions repel, the liquid pushes itself out of the capillary and forms a mist of small droplets about 10 μm across. The aerosol is at least partially produced by a process involving the formation of a cone and a jet from the tip of this cone. As the solvent evaporates, the analyte molecules are forced closer together, repel each other, and break up the droplets. This process is called Coulombic fission because it is driven by repulsive Coulombic forces between charged molecules. The process repeats until the analyte is free of solvent and is a lone ion. Lone ions move to the mass analyzer of a mass spectrometer. The ions observed may be quasimolecular ions created by the addition of a proton (a hydrogen ion) and denoted $[M+H]^+$, or of another cation such as sodium ion, $[M+Na]^+$ or the removal of a proton, $[M-H]^-$. Multiply-charged ions such as $[M+2H]^{2+}$ are often observed. All of these are even-electron ion species: electrons (alone) are not added or removed, unlike in some other ionizations.

Matrix-assisted laser desorption ionization (MALDI) is an ionization process triggered by a laser beam (normally a nitrogen laser). A matrix is used to protect the biomolecule from being destroyed by direct laser beam and to facilitate vaporization and ionization. A matrix-solution of crystallized molecules in a mixture of highly purified water and an organic solvent (normally acetonitrile (ACN) or ethanol) is used to protect the biomolecule from being destroyed by direct laser beam exposure and to facilitate vaporization and ionization.

Figure 4:
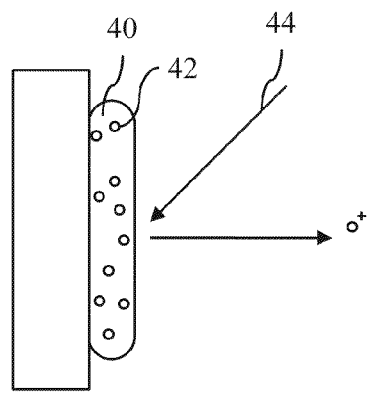
FIG. 4 is a schematic view of a process according to one or more aspects of the present disclosure.

In FIG. 4, matrix-assisted laser desorption ionization is depicted with matrix identified by reference numeral 40 and analyte identified by reference numeral 42. The laser is fired (as indicated by arrow 44) at the crystals in the MALDI spot. The matrix 40 absorbs the laser energy, and primarily the matrix 40 is ionized by this event. The matrix 40 then transfers part of its charge to the analyte molecules 42 (e.g., protein), thus ionizing them while still protecting them from the disruptive energy of the laser. Ions observed after this process consist of a neutral molecule [M] and an added or removed ion. Together, they form a quasimolecular ion, for example $[M+H]^+$ in the case of an added proton, $[M+Na]^+$ in the case of an added sodium ion, or $[M-H]^-$ in the case of a removed proton. MALDI generally produces singly-charged ions, but multiply charged ions ($[M+nH]^{n+}$) can also be observed, usually as a function of the matrix, the laser intensity and/or the voltage used.

Post-source fragmentation is most often what is being used in a tandem mass spectrometry experiment. Energy can also be added to the (usually already) vibrationally excited ions through post-source collisions with neutral atoms or molecules, the absorption of radiation, or the transfer or capture of an electron by a multiply charged ion.

Collision-induced dissociation (CID), also called collision-activated dissociation (CAD), involves the collision of an ion with a neutral atom or molecule in the gas phase. The molecular ions are accelerated by some electrical potential to high kinetic energy in the vacuum of a mass spectrometer and then allowed to collide with neutral gas molecules (often helium, nitrogen or argon). In the collision, some of the kinetic energy is converted into internal energy which results in bond breakage and the fragmentation of the molecular ion into smaller fragments. These fragment ions can then be analyzed by a mass spectrometer. For example, consider:

$$AB^+ + M \rightarrow A + B^+ + M$$

where the ion $AB^+$ collides with the neutral species M, and as a result, breaks apart.

Electron capture dissociation (ECD) is a method of fragmenting gas phase ions for tandem mass spectrometric analysis (structural elucidation). ECD involves the direct introduction of low energy electrons to trapped gas phase ions. Electron capture dissociation typically involves a multiply-protonated molecule M interacting with a free electron to form an odd-electron ion. If an electron is added to a multiply-charged positive ion, the liberation of the electric potential energy results in fragmentation of the product ion.

$$[M+nH]^{n+} + e^- \rightarrow [[M+nH]^{(n-1)+}]\cdots* \rightarrow \text{fragments}$$

ECD produces significantly different types of fragment ions than other fragmentation methods such as collision-induced dissociation and infrared multiphoton dissociation. These other methods introduce internal vibrational energy in some way or another while ECD does not. The unique (and complementary) fragments observed and the ability to fragment whole macromolecules effectively has been promising.

The mechanism of ECD does not necessarily break the weakest bond and is therefore considered a fast process where energy is not free to relax intramolecularly. Radical reactions initiated by the electron may be responsible for the action of ECD.

In a technique similar to ECD, called electron transfer dissociation (ETD), the electrons are transferred by collision between the analyte cations and anions. Adding an electron through an ion-ion reaction is represented by:

$$[M+nH]^{n+} + A^- \rightarrow [[M+(n-1)H]^{(n-1)+}]*A \rightarrow \text{fragments}$$

In infrared multiphoton dissociation (IRMPD), an infrared laser is directed through a window into the vacuum of the mass spectrometer where the ions are. The mechanism of fragmentation involves the absorption by a given ion of multiple infrared photons. The parent ion becomes excited into more energetic vibrational states until a bond(s) is broken, resulting in gas phase fragments of the parent ion. In other words, the energy required for dissociation can be added by photon absorption, resulting in ion photodissociation and represented by:

$$AB^+ + h\nu \rightarrow A + B^+$$

where hν represents the photon absorbed by the ion. The infrared photons will heat the ions and cause dissociation if enough of them are absorbed. This process is often accomplished with a carbon dioxide laser and an ion trapping mass spectrometer such as a FTMS. Ultraviolet lasers can also be used, but may lead to excessive fragmentation of biomolecules. Blackbody radiation can also be used in a technique known as blackbody infrared radiative dissociation (BIRD). In the BIRD method, the entire mass spectrometer vacuum chamber is heated to create infrared radiation.

The various methods described above may be implemented or performed in a downhole environment according to one or more aspects of the present disclosure. One such environment is depicted in FIG. 5.

Figure 5:
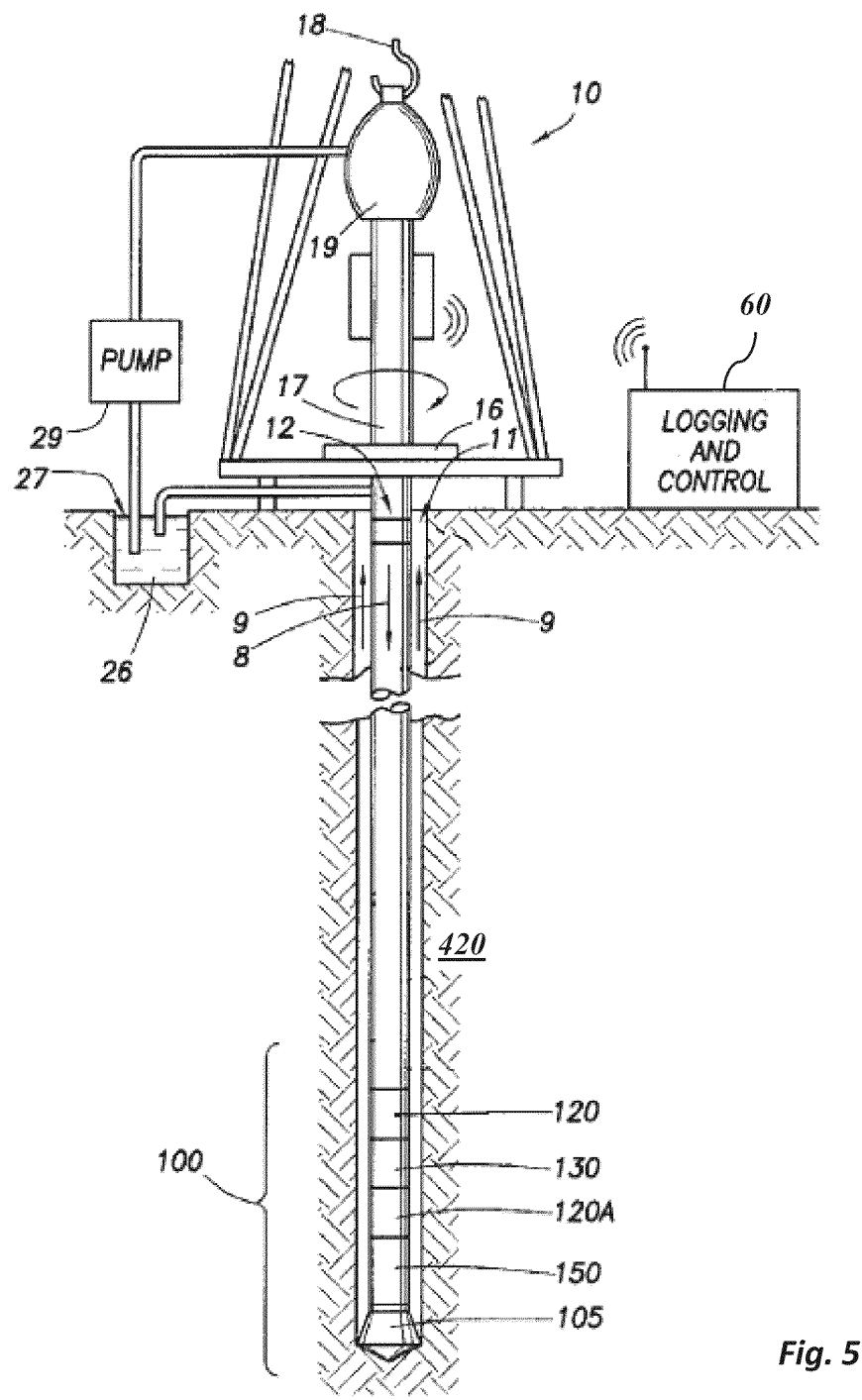
FIG. 5 is a schematic view of apparatus according to one or more aspects of the present disclosure.

FIG. 5 is a schematic view of an example well site system according to one or more aspects of the present disclosure. The well site may be situated onshore (as shown) or offshore. The system may comprise one or more while-drilling devices 120, 120A, 130 that may be configured to be positioned in a wellbore 11 penetrating a subsurface formation 420. The wellbore 11 may be drilled through subsurface formations by rotary drilling in a manner that is well known in the art.

A drill string 12 may be suspended within the wellbore 11 and may include a bottom hole assembly (BHA) 100 proximate the lower end thereof. The BHA 100 may include a drill bit 105 at its lower end. It should be noted that in some implementations, the drill bit 105 may be omitted and the bottom hole assembly 100 may be conveyed via tubing or pipe. The surface portion of the well site system may include a platform and derrick assembly 10 positioned over the wellbore 11, the assembly 10 including a rotary table 16, a kelly 17, a hook 18 and a rotary swivel 19. The drill string 12 may be rotated by the rotary table 16, which is itself operated by well known means not shown in the drawing. The rotary table 16 may engage the kelly 17 at the upper end of the drill string 12. As is well known, a top drive system (not shown) could alternatively be used instead of the kelly 17 and rotary table 16 to rotate the drill string 12 from the surface. The drill string 12 may be suspended from the hook 18. The hook 18 may be attached to a traveling block (not shown) through the kelly 17 and the rotary swivel 19, which may permit rotation of the drill string 12 relative to the hook 18.

The surface system may include drilling fluid (or "mud") 26 stored in a tank or pit 27 formed at the well site. A pump 29 may deliver the drilling fluid 26 to the interior of the drill string 12 via a port in the swivel 19, causing the drilling fluid 26 to flow downwardly through the drill string 12 as indicated by the directional arrow 8. The drilling fluid 26 may exit the drill string 12 via water courses, nozzles, or jets in the drill bit 05, and then may circulate upwardly through the annulus region between the outside of the drill string and the wall of the wellbore, as indicated by the directional arrows 9. The drilling fluid 26 may lubricate the drill bit 105 and may carry formation cuttings up to the surface, whereupon the drilling fluid 26 may be cleaned and returned to the pit 27 for recirculation.

The bottom hole assembly 100 may include a logging-while-drilling (LWD) module 120, a measuring-while-drilling (MWD) module 130, a rotary-steerable directional drilling system and, hydraulically operated motor 150, and the drill bit 105. The LWD module 120 may be housed in a special type of drill collar, as is known in the art, and may contain a plurality of known and/or future-developed types of well logging instruments. It will also be understood that more than one LWD module may be employed, for example, as represented at 120A (references, throughout, to a module at the position of LWD module 120 may alternatively mean a module at the position of LWD module 120A as well). The LWD module 120 may include capabilities for measuring, processing, and storing information, as well as for communicating with the MWD 130. In particular, the LWD module 120 may include a processor configured to implement one or more aspects of the methods described herein. For example, the LWD module 120 may comprise a testing-while-drilling device configured to utilize the above-described ionization and spectrometry methods to determine the composition of a fluid downhole, such as a borehole fluid, drilling fluid (mud), formation fluid sampled from the formation 420, and/or others.

The MWD module 130 may also be housed in a special type of drill collar, as is known in the art, and may contain one or more devices for measuring characteristics of the drill string and drill bit. The MWD module 130 may further include an apparatus (not shown) for generating electrical power for the downhole portion of the well site system. Such apparatus typically includes a turbine generator powered by the flow of the drilling fluid 26, it being understood that other power and/or battery systems may be used while remaining within the scope of the present disclosure. In the present example, the MWD module 130 may include one or more of the following types of measuring devices: a weight-on-bit measuring device, a torque measuring device, a vibration measuring device, a shock measuring device, a stick slip measuring device, a direction measuring device, and an inclination measuring device. Optionally, the MWD module 130 may further comprise an annular pressure sensor and/or a natural gamma ray sensor. The MWD module 130 may include capabilities for measuring, processing, and storing information, as well as for communicating with a logging and control unit 60. For example, the MWD module 130 and the logging and control unit 60 may communicate information (uplinks and/or downlinks) via mud pulse telemetry (MPT) and/or wired drill pipe (WDP) telemetry, among other telemetry types within the scope of the present disclosure. In some cases, the logging and control unit 60 may include a controller having an interface configured to receive commands from a surface operator. Thus, commands may be sent to one or more components of the BHA 100, such as to the LWD module 120.

Figure 6:
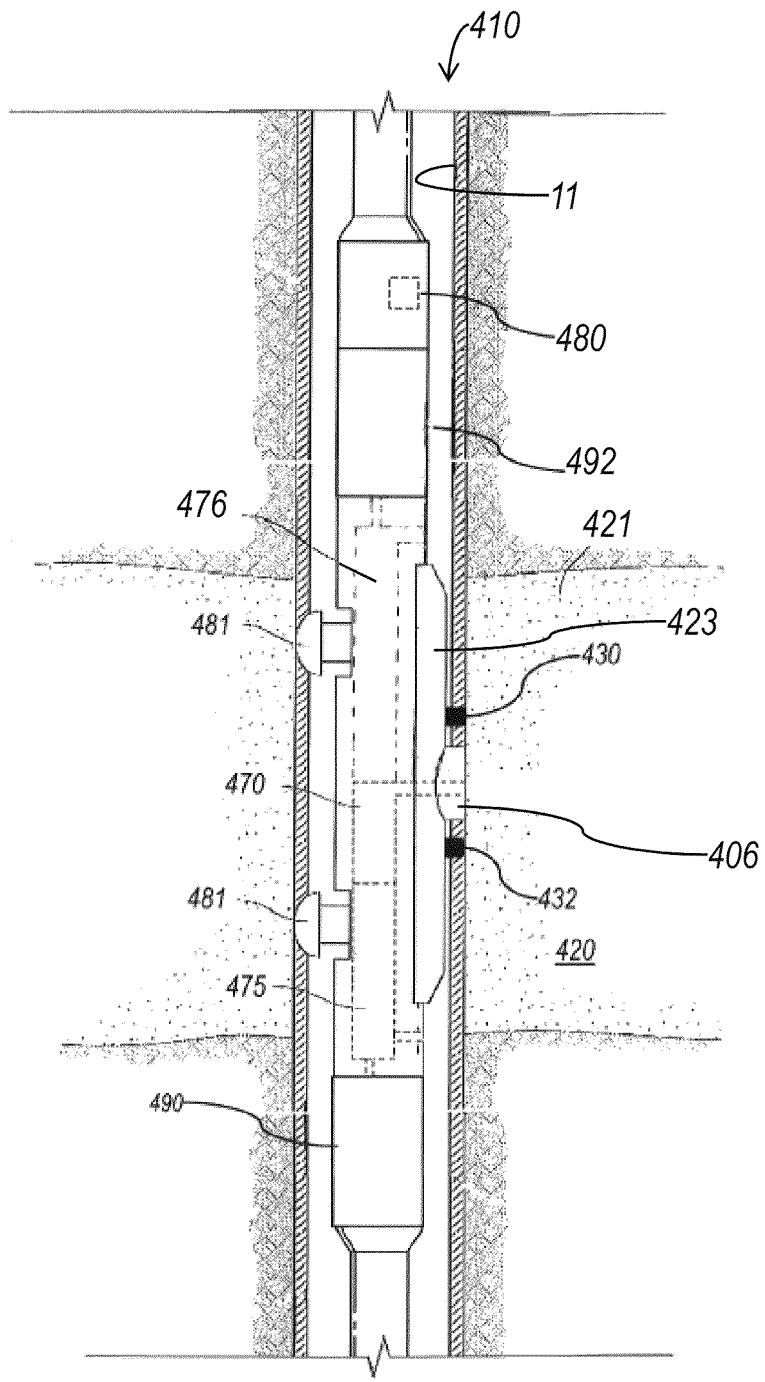
FIG. 6 is a schematic view of apparatus according to one or more aspects of the present disclosure.

A testing-while-drilling device 410 (e.g., identical or similar to the LWD tool 120 in FIG. 5) is shown in FIG. 6. The testing-while-drilling device 410 may be provided with a stabilizer that may include one or more blades 423 configured to engage a wall of the wellbore 11. The testing-while-drilling device 410 may be provided with a plurality of backup pistons 481 configured to assist in applying a force to push and/or move the testing-while-drilling device 410 against the wall of the wellbore 411. The configuration of the blade 423 and/or the backup pistons 481 may be of a type described, for example, in U.S. Pat. No. 7,114,562, incorporated herein by reference in its entirety. However, other types of blade or piston configurations may be used to implement the testing-while-drilling device 410 within the scope of the present disclosure. A probe assembly 406 may extend from the stabilizer blade 423 of the testing-while-drilling device 410. The probe assembly 406 may be configured to selectively seal off or isolate selected portions of the wall of the wellbore 411 to fluidly couple to an adjacent formation 420. Thus, the probe assembly 406 may be configured to fluidly couple components of the testing-while-drilling device 410, such as pumps 475 and/or 476, to the adjacent formation 420. Once the probe assembly 406 fluidly couples to the adjacent formation 420, various measurements may be conducted on the adjacent formation 420. For example, a pressure parameter may be measured by performing a pretest. Alternatively, or additionally, a sample may be withdrawn from the formation 420 via the probe assembly 406, and this sample may be analyzed using the ionization and spectrometry methods described above, possibly in conjunction with an ionization and/or spectrometry device also positioned within the device 410 and/or another component of the drill string.

The pump 476 may be used to draw subterranean formation fluid 421 from the formation 420 into the testing-while-drilling device 410 via the probe assembly 406. The fluid may thereafter be expelled through a port into the wellbore, or it may be sent to one or more fluid analyzers disposed in a sample analysis module 492, which may receive the formation fluid for subsequent analysis. Such fluid analyzers may, for example, comprise a spectrometer and means for interpreting spectral data therefrom, such as to determine fluid composition utilizing the ionization and spectrometry methods described above. The sample analysis module 492 may also or alternatively be configured to perform such analysis on fluid obtained from the wellbore and/or drill string. For example, the sample analysis module 492 may be configured for use in mud-gas logging operations, wherein gas extracted from mud before and/or after the bit is analyzed to determine composition and/or concentrations; as described herein.

The stabilizer blade 423 of the testing-while-drilling device 410 may be provided with a plurality of sensors 430, 432 disposed adjacent to a port of the probe assembly 406. The sensors 430, 432 may be configured to determine petrophysical parameters (e.g., saturation levels) of a portion of the formation 420 proximate the probe assembly 406. For example, the sensors 430 and 432 may be configured to measure electric resistivity, dielectric constant, magnetic resonance relaxation time, nuclear radiation, and/or combinations thereof.

The testing-while-drilling device 410 may include a fluid sensing unit 470 through which the obtained fluid samples and/or injected fluids may flow, and which may be configured to measure properties of the flowing fluid. It should be appreciated that the fluid sensing unit 470 may include any combination of conventional and/or future-developed sensors within the scope of the present disclosure.

A downhole control system 480 may be configured to control the operations of the testing-while-drilling device 410. For example, the downhole control system 480 may be configured to control the extraction of fluid samples from the formation 420, wellbore and/or drill string, the analysis thereof, and any pumping thereof, for example, via the pumping rate of the pumps 475 and/or 476.

The downhole control system 480 may be further configured to analyze and/or process data obtained from the downhole sensors and/or disposed in the fluid sensing unit 470 or from the sensors 430, and/or the fluid analysis module 492. The downhole control system 480 may be further configured to store measurement and/or processed data, and/or communicate measurement and/or processed data to another component and/or the surface for subsequent analysis.

While the testing-while drilling device 410 is depicted with one probe assembly, multiple probes may be provided with the testing-while drilling device 410 within the scope of the present disclosure. For example, probes of different inlet sizes, shapes (e.g., elongated inlets) or counts, seal shapes or counts, may be provided.

Figure 7:
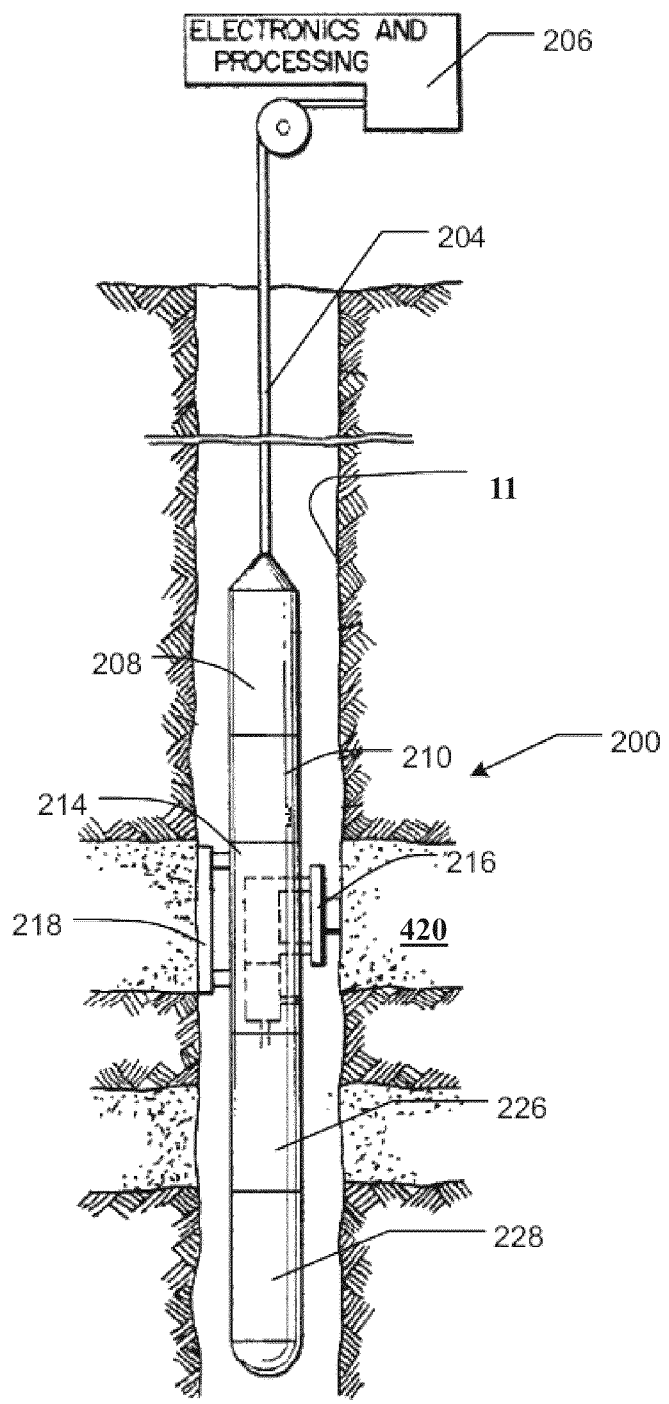
FIG. 7 is a schematic view of apparatus according to one or more aspects of the present disclosure.

Turning to FIG. 7, an example well site system according to one or more aspects of the present disclosure is shown. The well site may be situated onshore (as shown) or offshore. A wireline tool 200 may be configured to seal a portion of a wall of a wellbore 11 penetrating a subsurface formation 420.

The example wireline tool 200 may be suspended in the wellbore 11 from a lower end of a multi-conductor cable 204 that may be spooled on a winch (not shown) at the Earth's surface. At the surface, the cable 204 may be communicatively coupled to an electronics and processing system 206. The electronics and processing system 206 may include a controller having an interface configured to receive commands from a surface operator. In some cases, the electronics and processing system 206 may further include a processor configured to implement one or more aspects of the methods described herein.

The example wireline tool 200 may include a telemetry module 210, a formation tester 214, and other modules 226, 228. Although the telemetry module 210 is shown as being implemented separate from the formation tester 214, the telemetry module 210 may be implemented in the formation tester 214. Additional components may also be included in the tool 200.

The formation tester 214 may comprise a selectively extendable probe assembly 216 and a selectively extendable tool anchoring member 218 that are respectively arranged on opposite sides of the body 208. The probe assembly 216 may be configured to selectively seal off or isolate selected portions of the wall of the wellbore 11. Thus, the probe assembly 216 may be configured to fluidly couple pumps and/or other components of the formation tester 214 to the adjacent formation 420.

The formation tester 214 may be used to obtain fluid samples from the formation 420. A fluid sample may thereafter be expelled through a port into the wellbore or the sample may be sent to one or more fluid collecting or analyzing chambers disposed in the one or more other modules 226, 228. The above-described ionization and/or spectrometry may then be performed on the formation fluid.

The probe assembly 216 of the formation tester 214 may be provided with a plurality of sensors 222 and 224 disposed adjacent to a port of the probe assembly 216. The sensors 222 and 224 may be configured to determine petrophysical parameters (e.g., saturation levels) of a portion of the formation 420 proximate the probe assembly 216. For example, the sensors 222 and 224 may be configured to measure or detect one or more of electric resistivity, dielectric constant, magnetic resonance relaxation time, nuclear radiation, and/or combinations thereof.

The formation tester 214 may be provided with an additional fluid sensing unit (not shown) through which the obtained fluid samples and/or injected fluids may flow and which is configured to measure properties and/or composition data of the flowing fluids. For example, the fluid sensing unit may include a fluorescence sensor, such as described in U.S. Pat. Nos. 7,002,142 and 7,075,063, incorporated herein by reference in their entireties. The fluid sensing unit may alternatively or additionally include an optical fluid analyzer, for example as described in U.S. Pat. No. 7,379,180, incorporated herein by reference in its entirety. The fluid sensing unit may alternatively or additionally comprise a density and/or viscosity sensor, for example as described in U.S. Patent Application Pub. No. 2008/0257036, incorporated herein by reference in its entirety. The fluid sensing unit may alternatively or additionally include a high resolution pressure and/or temperature gauge, for example as described in U.S. Pat. Nos. 4,547,691 and 5,394,345, incorporated herein by reference in their entireties. An implementation example of sensors in the fluid sensing unit may be found in "New Downhole-Fluid Analysis-Tool for Improved Formation Characterization" by C. Dong, et al., SPE 108566, December 2008. It should be appreciated, however, that the fluid sensing unit may include any combination of conventional and/or future-developed sensors within the scope of the present disclosure. The various fluid sensor and analyzer configurations described above may also be implemented in a while-drilling environment, such as that shown in FIGS. 5 and/or 6 and described above.

The telemetry module 210 may comprise a downhole control system communicatively coupled to the electrical control and data acquisition system 206. The electrical control and data acquisition system 206 and/or the downhole control system may be configured to control the probe assembly 216, the extraction of fluid samples from the formation 230, and/or extraction of fluid from the drill string or borehole. The electrical control and data acquisition system 206 and/or the downhole control system may be further configured to analyze and/or process data obtained from downhole sensors, store measurements or processed data, and/or communicate measurements or processed data to the surface or another component for subsequent analysis.

In any of the implementations described above or otherwise within the scope of the present disclosure, liquid samples to be analyzed may be obtained from the formation, from drilling mud travelling down the drill string (for "before the bit" measurements), and/or from drilling mud in the annulus between the drill string and the wellbore wall (for "after the bit" measurements). Such samples may comprise at least one of hydrocarbons, hydrogen sulfide, carbon dioxide, nitrogen, hydrogen and helium. Such samples may be expanded by using a cylinder and piston, or by fixed volume chambers. Examples of such implementations include those described in related PCT Application PCT/US09/51016.

Figure 8:
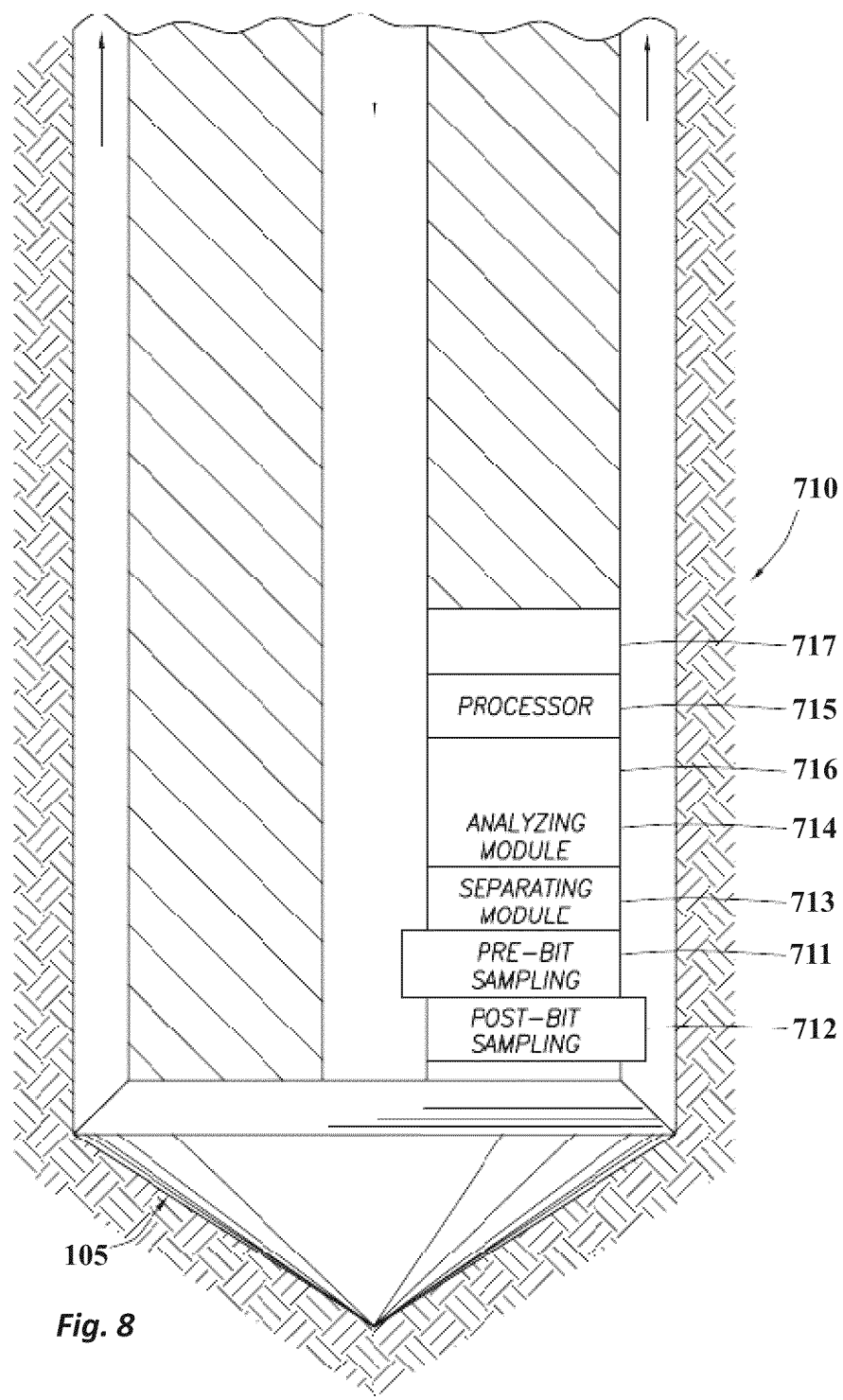
FIG. 8 is a schematic view of apparatus according to one or more aspects of the present disclosure.

Techniques described herein can be performed using various types of downhole equipment. FIG. 8 shows a diagram of a subsystem 710 according to one or more aspects of the present disclosure. The subsystem 710 may, for example, be at least a portion of one of the modules shown in FIGS. 5 and/or 6, among others within the scope of the present disclosure. The modules of subsystem 710 may be configured to communicate with each other. The subsystem 710 includes sampling modules 711 and 712. The module 711 samples the mud within the drill collar before it reaches the drill bit 105 to obtain a pre-bit sample, and the module 712 samples the mud, including entrained components, in the annulus after passage through the drill bit 105 to obtain a post-bit sample. It will be understood that the sampling modules 711 and 712 may share at least some components. The subsystem 710 also includes separating and analyzing modules 713 and 714, respectively, and an electronic processor 715, which has associated memory (not separately shown), sample storage and disposition module 716, which can store selected samples and can also expel samples and/or residue to the annulus, and local communication module 717 configured to communicate with one or more other communications components within the drill string. It will be understood that some of the individual modules may be in plural form.

Figure 9:
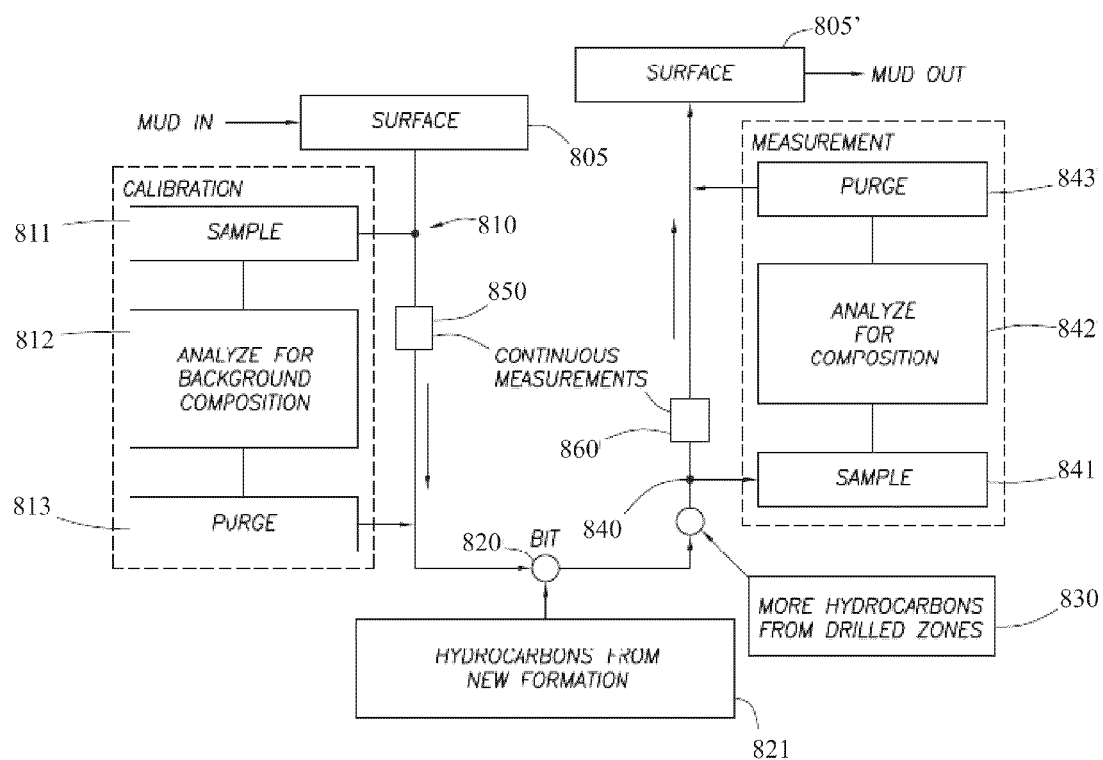
FIG. 9 is a schematic view of a process according to one or more aspects of the present disclosure.

FIG. 9 is a diagram that illustrates a process according to one or more aspects of the present disclosure which may utilize techniques described herein. Drilling mud from a surface location 805 arrives, after travel through the drill string, at a (pre-bit) calibration measurement location 810, where sampling (block 811), analysis for background composition 812, and purging (block 813) may be implemented. The mud then passes the drill bit 820, and hydrocarbons (as well as other fluids and solids) from a new formation being drilled into (block 821) are mixed with the mud. The mud in the annulus will also contain hydrocarbon and other components from zones already drilled through (block 830). The mud in the annulus arrives at (post-bit) measurement location 840, where sampling (block 841), analysis for composition (block 842) and purging (block 843) may be implemented, and the mud in the annulus then returns toward the surface (805'). The processor 715 (FIG. 8) may be configured to determine component concentrations utilizing the above-described combined ionization and/or spectrometry methods.

Figure 10:
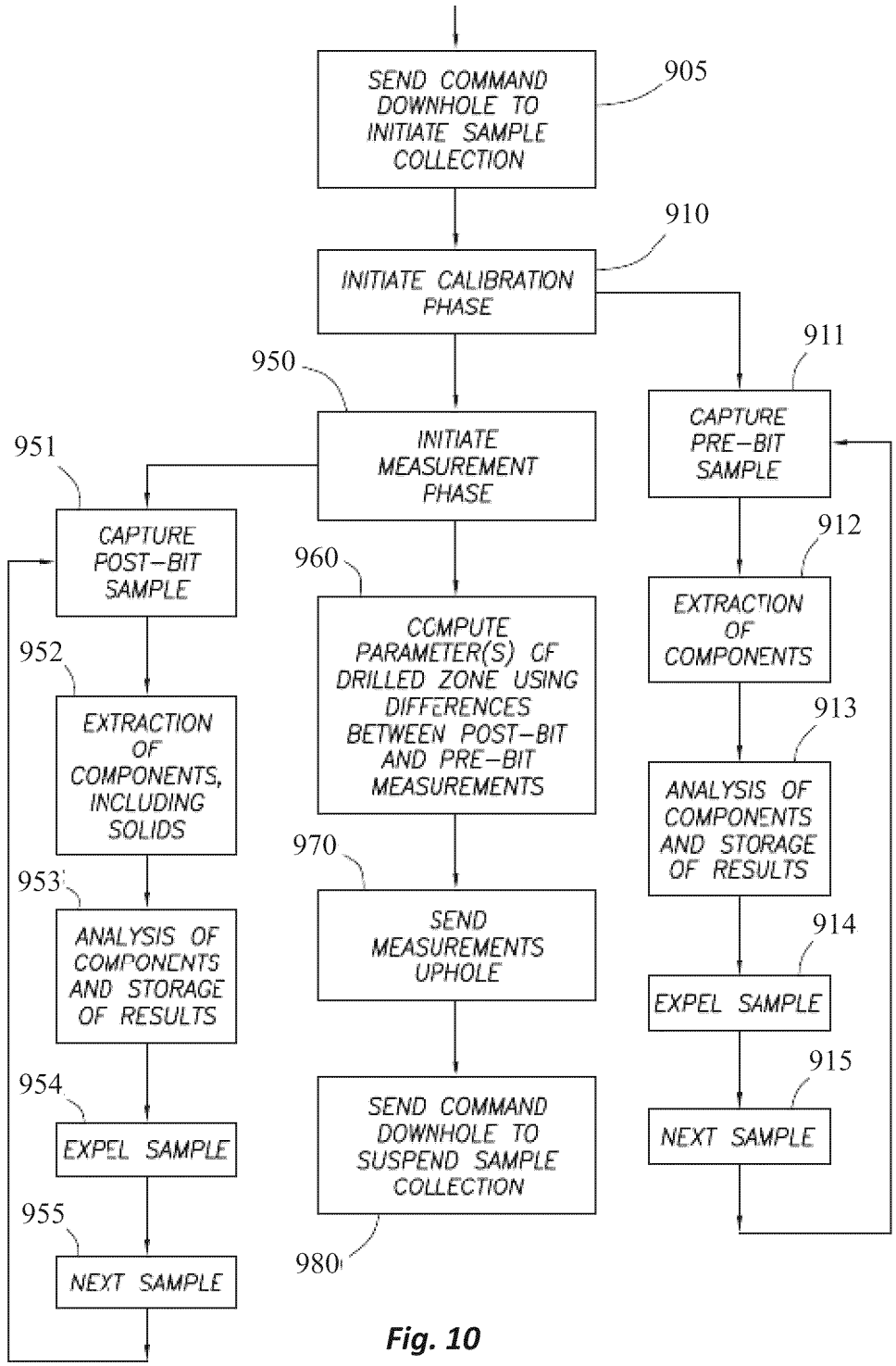
FIG. 10 is a schematic view of a process according to one or more aspects of the present disclosure.

FIG. 10 is a flow diagram of an example routine for controlling the uphole and downhole processors in implementing one or more aspects of the present disclosure. The block 905 represents sending of a command downhole to initiate collection of samples at preselected times and/or depths. A calibration phase is then initiated (block 910), and a measurement phase is also initiated (block 950). The calibration phase includes blocks 910-915.

The block 911 represents capture (by module 711 of FIG. 8) of a sample within the mud flow in the drill collar before it reaches the drill bit. Certain components are extracted from the mud (block 912), and analysis is performed on the pre-bit sample using, for example, the analysis module(s) 713 of FIG. 8, as well as storage of the results as a function of time and/or depth (block 913). The block 914 represents expelling of the sample (although here, as elsewhere, it will be understood that some samples, or constituents thereof, may be retained). Then, if this part of the routine has not been terminated, the next sample (block 915) is processed, beginning with re-entry to block 911.

The measurement phase, post-bit, includes blocks 951-955. The block 951 represents capture (by module 712 of FIG. 8) of a post-bit sample within the annulus, which will include entrained components, matrix rock and fluids, from the drilled zone. The block 952 represents extraction of components, including solids and fluids, and analysis is performed using, for example, the analysis module(s) 713 of FIG. 8, as well as storage of the results as a function of time and/or depth (block 953). The sample can then be expelled (block 954). (Again, if desired, some samples, or constituents thereof, can be retained.) Then, if this part of the routine has not been terminated (e.g., by command from uphole and/or after a predetermined number of samples, an indication based on a certain analysis result, etc.), the next sample (block 955) is processed, beginning with re-entry to block 951.

The block 960 represents optional computation of parameter(s) of the drilled zone using comparisons between the post-bit and pre-bit measurements. The block 970 represents the transmission of measurements uphole. These can be the analysis measurements, computed parameters, and/or any portion or combination thereof. Uphole, the essentially "real time" measurements can, optionally, be compared with surface mud logging measurements or other measurements or data bases of known rock and fluid properties (e.g., fluid composition or mass spectra). The block 980 represents the transmission of a command downhole to suspend sample collection until the next collection phase.

Regarding the command to the downhole tool to initiate sampling and analysis, the decision as to when to take a sample, or the frequency of sampling, can be based on various criteria. An example of one such criterion being to downlink to the tool every time a sample is required. Another example being to take a sample based on the reading of some open hole logs, e.g., resistivity, NMR, and/or nuclear logs. Yet another example being to take a sample based on a regular increment or prescribed pattern of measured depths or time.

After the sample is captured, a first extraction step comprises extracting, from the sample, gases which are present, and volatile hydrocarbon components as a gas. When extraction is performed at the surface, a first step may comprise dropping the pressure in the mud return line and flashing the gas into a receptacle, as described above. To improve the extraction of gases, agitators of various forms may be used. For volatile, and not so volatile liquids, steam stills may be employed. To expand the volume of a mud sample captured within a down hole tool, a cylinder and piston device can be used, as described above. Other methods may also or alternatively be used, including the use of a reversible down hole pump, or gas selective membranes, one for each gas. Alternatively, the liquid sample can be passed through a nozzle into a second chamber of lower pressure, which may ensure that the gas from all the liquid volume has been extracted and does not rely on stirring the sample. A simple pressure reduction can work well for small volume samples, but when the sample volume is large the sample may require stirring. Other types of mechanical separation such as centrifuging, can also be used. For example, once the volatiles have been extracted, they can be passed through moisture absorbing column, commonly known as desiccant, and then forwarded to the gas separation and measurement system, such as FTIR and/or quadrupole MS.

After hydrocarbons and other gases have been extracted, the above-described compositional analysis can be performed.

Figure 11:
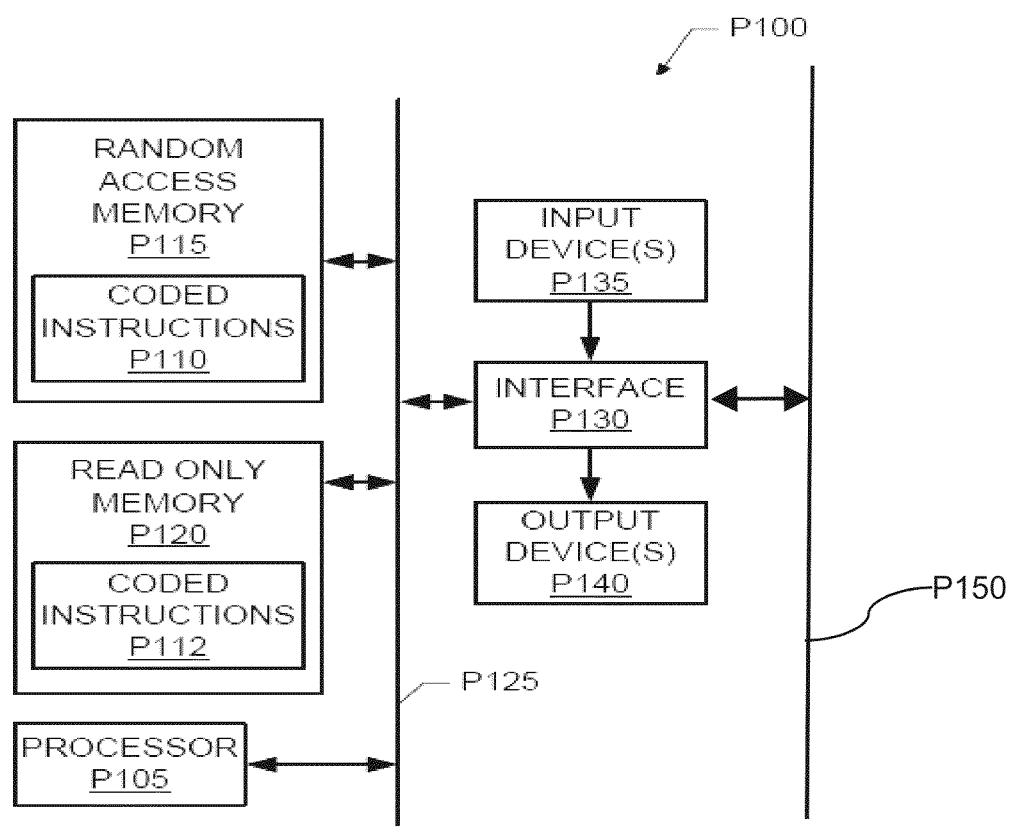
FIG. 11 is a schematic view of apparatus according to one or more aspects of the present disclosure.

FIG. 11 is a schematic view of at least a portion of an example computing system P100 that may be programmed to carry out all or a portion of the methods of analysis described herein and/or other methods within the scope of the present disclosure. The computing system P100 may be used to implement all or a portion of the electronics, processing and/or control systems and/or components described above, and/or other control means within the scope of the present disclosure. The computing system P100 shown in FIG. 11 may be used to implement surface components (e.g., components located at the Earth's surface) and/or downhole components (e.g., components located in a downhole tool) of a distributed computing system.

The computing system P100 may include at least one general-purpose programmable processor P105. The processor P105 may be any type of processing unit, such as a processor core, a processor, a microcontroller, etc. The processor P105 may execute coded instructions P110 and/or P112 present in a main memory of the processor P105 (e.g., within a RAM P115 and/or a ROM P120). When executed, the coded instructions P110 and/or P112 may cause the formation tester or the testing while drilling device to perform at least a portion of the methods described herein, among other operations.

The processor P105 may be in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown). The memory P115, P120 may be used to store, for example, measured formation properties (e.g., formation resistivity), petrophysical parameters (e.g., saturation levels, wettability), injection volumes and/or pressures.

The computing system P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The example input device P135 may be used to, for example, collect data from the above-described sensors and/or analyzing devices. The example output device P140 may be used to, for example, display, print and/or store on a removable storage media one or more of measured formation properties (e.g., formation resistivity values or images), petrophysical parameters (e.g., saturation levels or images, wettability), injection volumes and/or pressures. Further, the interface circuit P130 may be connected to a telemetry system P150, including, a multi-conductor cable, mud pulse telemetry (MPT) and/or wired drill pipe (WDP) telemetry. The telemetry system P150 may be used to transmit measurement data, processed data and/or instructions, among other things, between the surface and downhole components of the distributed computing system.

The present disclosure introduces a method comprising: obtaining a mass spectrum of a sample; and determining a concentration of a component of the composition of the sample by utilizing ionization and spectrometry. The composition may be at least one of: formation fluid sampled from a subterranean formation, drilling mud sampled from within a drill string, and drilling mud sampled from an annulus formed between the drill string and a borehole penetrating the subterranean formation. Performing ionization and/or spectrometry may be performed downhole. Determining the concentration of the component may be performed downhole. Determining the concentration of the component may comprise determining a proportion of the component relative to another component of the composition. The sample may have an unknown composition prior to performing the method. The method may further comprise determining a concentration of another component of the composition of the sample by again performing ionization and/or spectrometry. Determining the concentrations of the components may comprise determining a relative concentration of the components. The method may not utilize gas chromatography.

The present disclosure also introduces an apparatus comprising: means for ionizing at least a portion of a sample; means for obtaining a mass spectrum of at least a portion of the ionized sample; and means for determining a concentration of a component of the composition of the sample by utilizing at least the obtained mass spectrum. The composition may be at least one of: formation fluid sampled from a subterranean formation, drilling mud sampled from within a drill string, and drilling mud sampled from an annulus formed between the drill string and a borehole penetrating the subterranean formation. The means for ionizing the sample may be configured to ionize the sample downhole. The means for obtaining the mass spectrum may be configured to obtain the mass spectrum downhole. The component concentration determining means may be configured to determine the concentration of the component downhole. The component concentration determining means may be configured to determine relative concentrations of a plurality of components of the composition of the sample utilizing at least the obtained mass spectrum. The mass spectrum obtaining means and the component concentration determining means may not utilize gas chromatography.

Figure 12:
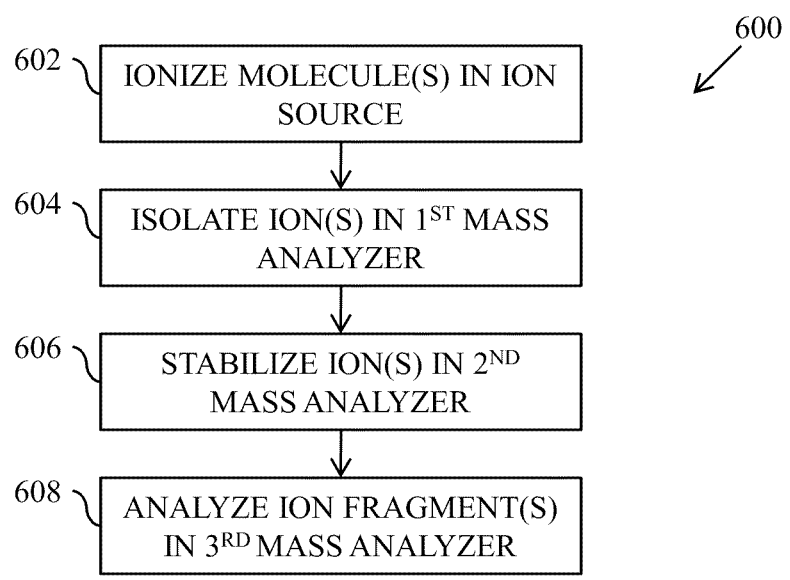
FIG. 12 is a schematic view of a process according to one or more aspects of the present disclosure.

One example of utilizing the above-described methods to determine sample composition is depicted as method 600 shown in FIG. 12. The method 600 comprises a step 602 in which one or more molecules are ionized in an ion source. For example, the molecule(s) may be ionized by methane in a CIS. In subsequent step 604, a first mass analyzer isolates one or more specific ions. For example, a mass filter quadrupole may isolate one or more specific ions from many others. These specific ions then go through a second mass analyzer in step 606, which stabilizes the ions while they collide with a gas. For example, step 606 may comprise causing the ions to fragment by CID, or step 606 may comprise causing the ions to absorb a photon by IRMPD. In step 608, a third mass analyzer catalogs the fragments produced from the colliding ion(s). The spectrum issued by the third mass analyzer provides information about the parent ion, such as the molecule configuration (isomer discrimination).

The method 600 and others within the scope of the present disclosure may be performed or otherwise implemented via the example apparatus depicted in FIGS. 5-8. For example, one or more of the components 120, 120A, and/or 130 of FIG. 5, one or more of the components 430, 432, 470, and/or 492 of FIG. 6, one or more of the components 214, 226, and/or 228 of FIG. 7, and/or one or more of the components 711-714 of FIG. 8 may be configured to perform one or more of steps 602-608 of the method 600. Moreover, one or more of steps 602-608 may be performed in conjunction with at least a portion of the process shown in FIG. 9 and/or the method shown in FIG. 8.

In view of all of the above, those skilled in the art should readily recognize that the present disclosure introduces methods and apparatus for downhole mass spectrometry utilizing three mass spectrometers. Once a molecule has been ionized by methane in a closed ion source, a first mass filter quadrupole is used to isolate specific ions from many entering a mass spectrometer. The isolated ions are then passed through a second mass analyzer which stabilizes the ions while they collide with a gas, causing the ions to fragment by collision-induced dissociation (CID), or absorb a photon by IRMPD process. The fragmented ions produced from the colliding ions are cataloged using a third mass analyzer, and information about the parent ion is obtained from the spectrum issued by the third mass spectrometer, such as the molecule configuration (isomer discrimination).

The present disclosure also introduces a method comprising: using a first mass analyzer of a downhole tool to isolate specific ions within a sample received in the downhole tool, wherein the downhole tool is configured to be positioned within a wellbore extending through a subterranean formation; using a second mass analyzer of the downhole tool to stabilize the ions isolated by the first mass analyzer; and using a third mass analyzer of the downhole tool to catalog the stabilized ions. The method may further comprise ionizing a molecule of the sample using a closed ion source of the downhole tool, thereby generating the specific ions to be isolated using the first mass analyzer. The method may further comprise providing information about the isolated ions using spectrum data cataloged by the third mass analyzer. The information may comprise molecule configuration of a molecule from which the isolated ions have been generated. The information may comprise isomer discrimination information of the molecule. Using the second mass analyzer may comprise causing collision-induced dissociation (CID) or infrared multi-photon dissociation (IRMPD). At least one of the first mass analyzer, the second mass analyzer, and the third mass analyzer may comprise a mass filter quadrupole spectrometer. Similarly, the first mass analyzer may comprise a first mass filter quadrupole spectrometer, the second mass analyzer may comprise a second mass filter quadrupole spectrometer, and the third mass analyzer may comprise a third mass filter quadrupole spectrometer. The method may further comprise conveying the downhole tool within the wellbore via a drill string or a wireline. The method may further comprise operating the downhole tool to receive the sample from the subterranean formation. The method may further comprise operating the downhole tool to receive the sample from the wellbore.

The present disclosure also introduces an apparatus comprising: a downhole tool configured to be positioned within a wellbore extending through a subterranean formation, wherein the downhole tool comprises: an ion source configured to generate specific ions of a specific molecule of a sample received in the downhole tool; a first mass analyzer configured to isolate the specific ions; a second mass analyzer configured to stabilize the isolated ions; and a third mass analyzer configured to catalog the stabilized ions. The ion source may be a closed ion source. The second mass analyzer may be configured to stabilize the isolated ions by collision-induced dissociation (CID) or infrared multi-photon dissociation (IRMPD). At least one of the first mass analyzer, the second mass analyzer, and the third mass analyzer may comprise a mass filter quadrupole spectrometer. Similarly, the first mass analyzer may comprise a first mass filter quadrupole spectrometer, the second mass analyzer may comprise a second mass filter quadrupole spectrometer, and the third mass analyzer may comprise a third mass filter quadrupole spectrometer. The downhole tool may further comprise means for receiving the sample from drilling fluid in the borehole. The downhole tool may further or alternatively comprise means for receiving the sample from formation fluid in the subterranean formation.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method, comprising:
flowing drilling mud through a downhole tool positioned within a wellbore extending through a subterranean formation;
receiving a sample in the downhole tool;
using an ion source of the downhole tool to chemically ionize a molecule of the sample by at least ionizing a chemical reagent, wherein the chemical reagent is a component of the drilling mud, and wherein ionizing the chemical reagent causes an ionization plasma that reacts with the sample to generate specific ions;
using a first mass analyzer of the downhole tool to isolate the specific ions within the sample received in the downhole tool, wherein the downhole tool is configured to be positioned within the wellbore extending through the subterranean formation;
using a second mass analyzer of the downhole tool to stabilize the ions isolated by the first mass analyzer; and
using a third mass analyzer of the downhole tool to catalog the stabilized ions.

2. The method of claim 1, wherein the ion source comprises a closed ion source.

3. The method of claim 1, further comprising providing information about the isolated ions using spectrum data cataloged by the third mass analyzer.

4. The method of claim 3, wherein the information comprises molecule configuration of a molecule from which the isolated ions have been generated.

5. The method of claim 4, wherein the information comprises isomer discrimination information of the molecule.

6. The method of claim 1, wherein using the second mass analyzer comprises causing collision-induced dissociation (CID) or infrared multi-photon dissociation (IRMPD).

7. The method of claim 1, wherein at least one of the first mass analyzer, the second mass analyzer, and the third mass analyzer comprises a mass filter quadrupole spectrometer.

8. The method of claim 1, wherein the first mass analyzer comprises a first mass filter quadrupole spectrometer, wherein the second mass analyzer comprises a second mass filter quadrupole spectrometer, and wherein the third mass analyzer comprises a third mass filter quadrupole spectrometer.

9. The method of claim 1, further comprising conveying the downhole tool within the wellbore via a drill string or a wireline.

10. The method of claim 1, further comprising operating the downhole tool to receive the sample from the subterranean formation.

11. The method of claim 1, further comprising operating the downhole tool to receive the sample from the wellbore.

12. An apparatus, comprising:
 a downhole tool configured to receive a sample and to circulate a drilling mud within a wellbore extending through a subterranean formation, wherein the downhole tool comprises:
  an ion source comprising a chemical reagent that is a component of the drilling mud, wherein the ion source is configured to chemically ionize a specific molecule of the sample at least by ionizing the chemical reagent that is the component of the drilling mud, wherein ionizing the chemical reagent is configured to cause an ionization plasma that generates specific ions through reactions of the sample with the ionization plasma;
  a first mass analyzer configured to isolate the specific ions;
  a second mass analyzer configured to stabilize the isolated ions; and
  a third mass analyzer configured to catalog the stabilized ions.

13. The apparatus of claim 12, wherein the ion source is a closed ion source.

14. The apparatus of claim 12, wherein the second mass analyzer is configured to stabilize the isolated ions by collision-induced dissociation (CID) or infrared multi-photon dissociation (IRMPD).

15. The apparatus of claim 12, wherein at least one of the first mass analyzer, the second mass analyzer, and the third mass analyzer comprises a mass filter quadrupole spectrometer.

16. The apparatus of claim 12, wherein the first mass analyzer comprises a first mass filter quadrupole spectrometer, wherein the second mass analyzer comprises a second mass filter quadrupole spectrometer, and wherein the third mass analyzer comprises a third mass filter quadrupole spectrometer.

17. The apparatus of claim 12, wherein the downhole tool further comprises means for receiving the sample from drilling fluid in the borehole.

18. The apparatus of claim 12, wherein the downhole tool further comprises means for receiving the sample from formation fluid in the subterranean formation.

\* \* \* \* \*